April 15, 1941.   W. A. HUNTER   2,238,737
PROPELLER SHAFT MOUNTING
Filed Feb. 14, 1940
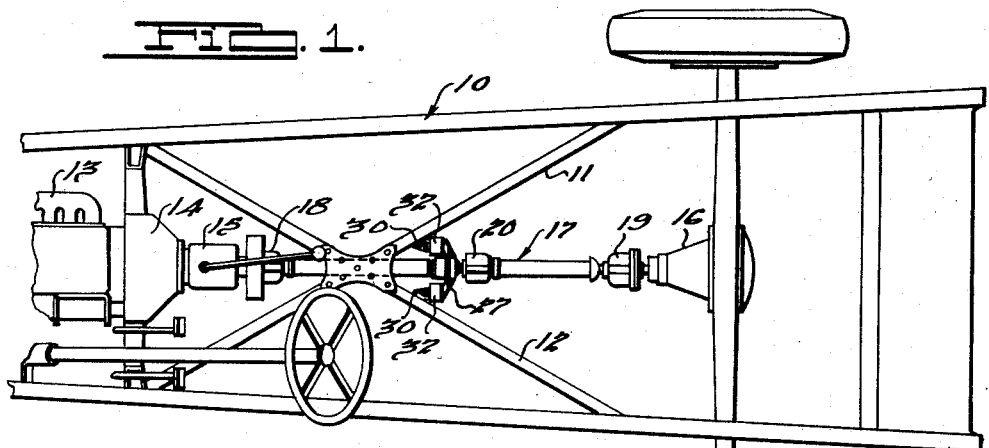
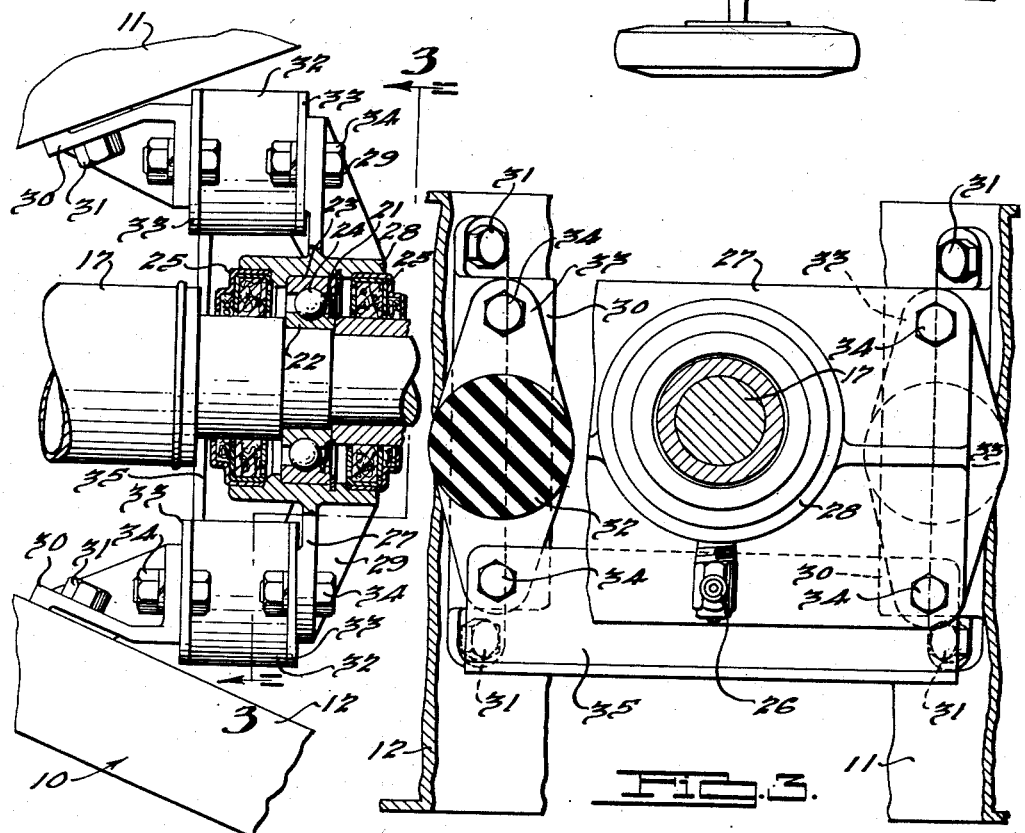
INVENTOR
William A. Hunter
BY Harness, Dind, Pate & Harris
ATTORNEYS.

Patented Apr. 15, 1941

2,238,737

UNITED STATES PATENT OFFICE 2,238,737

PROPELLER SHAFT MOUNTING

William A. Hunter, Highland Park, Mich., assignor to Chrysler Corporation, Highland Park, Mich., a corporation of Delaware Application February 14, 1940, Serial No. 318,969

3 Claims. (Cl. 180—70)

This invention relates to improvements in motor vehicle propeller shaft support.

An object of the invention is to provide a support which will yieldably accommodate deflection of the propeller shaft induced during rotation thereof, the support including rubber or rubber-like material which is stressed in shear in accommodating such deflection, as well as in supporting the shaft.

As the wheel base of a motor vehicle is increased, it is necessary to increase the length of the propeller shaft and as the latter occurs there is an increase in "ship" incident to deflection of the shaft during rotation thereof. In vehicles of such length as to accommodate bodies of the seven passenger type, for example, the length of the shaft is such that it is advantageous to provide a multiple sectional shaft, the sections being connected by a universal joint.

It is also advantageous to provide a bearing for the shaft intermediate the ends thereof and preferably at a point adjacent the universal joint connecting the shaft sections.

More particularly, an object of the invention is to provide a support of the foregoing type for the intermediate bearing as well as the propeller shaft.

Other objects and advantages of the invention will be more apparent from the following description taken in connection with the accompanying drawing, in which:

Fig. 1 is a top plan view of a portion of an automotive vehicle chassis including a propeller shaft supported according to the principles of the invention.

Fig. 2 is an enlarged fragmentary plan view, partly in section, illustrating the propeller shaft, bearing and support included in Fig. 1.

Fig. 3 is a view, partly in section, taken as indicated by the line 3—3 of Fig. 2.

Referring to the drawing, the numeral 10 designates an automotive vehicle frame including an X-brace structure formed in part by the brace members 11 and 12 which converge in a direction longitudinally of the frame adjacent the mid-portion thereof. A motor 13, clutch mechanism 14 and transmission mechanism 15 are supported by the frame, the transmission mechanism being connected to a differential mechanism 16 by a propeller shaft 17. This shaft is provided with a plurality of universal joints, such as joint 18 adjacent the transmission mechanism 15, the joint 19 adjacent the differential mechanism 16, and the joint 20 arranged at a point intermediate the ends of the shaft.

In arrangements of the foregoing type, it is desirable to support the propeller shaft at a point intermediate its ends and certain of the members constituting the X-brace structure are advantageously used for support purposes, this supporting connection including a yieldable non-metallic material such as rubber or material having the characteristics of the latter which will yieldably accommodate movement of the shaft relative to the frame support, this relative movement resulting from deflection of the shaft during rotation thereof.

As shown in Fig. 2, a bearing assembly 21 non-yieldably journals the shaft 17 at a point adjacent the universal joint 20, this bearing consisting of the inner and outer race members 22 and 23 respectively, and the intermediate friction elements 24. A suitable lubricant seal 25 is provided at either side of the bearing, lubricant being admitted to the latter through a nipple 26 shown in Fig. 3. A carrier or support, indicated at 27, has a mid-portion 28 provided with an opening receiving the shaft 17 bearing assembly 23 and lubricant seals 25, and is further provided with oppositely extending attaching side flanges 29 of angular formation. Each of the frame X-brace members 11 and 12 is provided with a bracket 30 secured thereto at vertically spaced points by bolts 31, one such bracket registering with the adjacent side flange 29 of the carrier 27.

The registering brackets and side flanges are connected by a body of yieldable non-metallic material 32, preferably rubber or a material having the characteristics thereof, whereby the shaft through its carrier is supported from the frame for movement relative thereto. A plate-like member 33 is secured, preferably by vulcanization, to each end face of the material 32 and has attaching portions extending therebeyond, as shown more particularly in Fig. 3, it being understood that the showing in connection with the attachment to the flanges 29 is typical to the construction by which the attachment is made to the brackets 30. Bolts 34 secure the forwardly disposed plates 33 to the brackets 30 carried by the frame members and also secure the rearwardly disposed plates 33 to the flanges 29 of the carrier 27.

As a safety measure, an angle member 35 is secured by the bolts 34 to the brackets 30 and extends beneath the shaft 17 so that in case of failure of the connection, including the material 32, this member will support the shaft.

In the foregoing arrangement, the material 32 is stressed in shear both in accommodating deflection of the shaft due to rotation thereof and in supporting the latter. The free and natural characteristics of rubber are more advantageously availed of when the same acts in shear rather than in compression. Rubber is softer when acting in shear than when acting in compression and hence there is less transmission of vibration in the former than in the latter and the rubber, being softer, is more active with the result that less volume is required to provide a given degree of relative movement.

Although but one embodiment of the invention is herein shown and described, it will be understood that various changes in the size, shape and arrangement of parts may be made without departing from the spirit of my invention and it is not my intention to limit said invention other than by the terms of the appended claims.

I claim:

1. In a motor vehicle including a frame having a pair of angularly disposed brace members and a rotatable propeller shaft having a plurality of universal joint connections; a bearing non-yieldably journalling said shaft at a point adjacent one of said connections, a carrier including a mid-portion having an opening therein receiving said bearing and shaft and having oppositely extending side flanges, a bracket secured to each of said brace members in registering relation with one of said side flanges, and a body of yieldable non-metallic material connecting the respective registering brackets and side flanges and accommodating relative movement therebetween, said material being so constructed and arranged as to be stressed in shear in accommodating said movement.

2. In a motor vehicle including a frame having a pair of angularly disposed brace members and a rotatable propeller shaft having a plurality of universal joint connections; a bearing non-yieldably journalling said shaft at a point adjacent one of said connections, a carrier including a mid-portion having an opening therein receiving said bearing and shaft and having oppositely extending side flanges, a bracket secured to each of said brace members in registering relation with one of said side flanges, a body of yieldable non-metallic material connecting the respective registering brackets and side flanges and accommodating relative movement therebetween, said material being so constructed and arranged as to be stressed in shear in accommodating said movement, and a member disposed beneath said shaft and secured to said brackets.

3. In a motor vehicle including a frame and a rotatable propeller shaft having a plurality of universal joint connections; a bearing non-yieldably journalling said shaft at a point adjacent one of said connections, a carrier including a mid-portion having an opening therein receiving said bearing and shaft and having oppositely extending side flanges, spaced supports secured to said frame in registering relation with said flanges respectively, and a body of yieldable non-metallic material connecting the respective registering supports and side flanges and accommodating relative movement therebetween, said material being so constructed and arranged as to be stressed in shear in accommodating said movement.

WILLIAM A. HUNTER.